United States Patent
Ignaczak et al.

(10) Patent No.: US 10,053,065 B2
(45) Date of Patent: Aug. 21, 2018

(54) AUTOMATIC REAR BRAKING

(71) Applicant: Robert Bosch GmbH, Stuttgart (DE)

(72) Inventors: Brad Ignaczak, Canton, MI (US);
Oliver Schwindt, Novi, MI (US);
James Kim, Royal Oak, MI (US);
Michael Neumeyer, San Mateo, CA (US)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 14/191,505

(22) Filed: Feb. 27, 2014

(65) Prior Publication Data

US 2015/0239437 A1 Aug. 27, 2015

(51) Int. Cl.
| | | |
|---|---|---|
| *B60T 7/22* | (2006.01) | |
| *B60T 8/171* | (2006.01) | |
| *B60T 8/32* | (2006.01) | |
| *B60T 8/1755* | (2006.01) | |

(52) U.S. Cl.
CPC ............... *B60T 7/22* (2013.01); *B60T 8/171* (2013.01); *B60T 8/17558* (2013.01); *B60T 8/32* (2013.01); *B60T 2201/022* (2013.01); *B60T 2201/12* (2013.01); *B60T 2230/08* (2013.01)

(58) Field of Classification Search
CPC .............. B60T 7/22; B60T 8/32; B60T 8/171
See application file for complete search history.

(56) References Cited

U.S. PATENT DOCUMENTS

| | | | |
|---|---|---|---|
| 4,574,908 A | 3/1986 | Brick | |
| 4,991,681 A | 2/1991 | Paulson | |
| 7,018,004 B2 * | 3/2006 | Chen | B60T 7/22 188/1.11 R |
| 7,102,495 B2 * | 9/2006 | Mattes | B60K 31/0008 180/276 |
| 7,375,620 B2 | 5/2008 | Balbale et al. | |
| 7,719,410 B2 | 5/2010 | Labuhn et al. | |
| 8,972,142 B2 * | 3/2015 | Takagi | B60T 7/22 701/70 |
| 9,020,727 B2 * | 4/2015 | Inoue | B60K 26/021 701/70 |

(Continued)

FOREIGN PATENT DOCUMENTS

| | | |
|---|---|---|
| DE | 102010028384 | 11/2010 |
| DE | 102009027656 | 1/2011 |
| DE | 102011084589 | 4/2013 |

(Continued)

OTHER PUBLICATIONS

European Patent Office Examination Report for Application No. 15155114 dated Jun. 29, 2015 (6 pages).

*Primary Examiner* — Todd Melton

(74) *Attorney, Agent, or Firm* — Michael Best & Friedrich LLP

(57) ABSTRACT

In one embodiment, the invention provides a method for controlling a vehicle brake system while the vehicle is in reverse. The method includes prefilling the brake system upon detecting an object in the vehicle's path. If the vehicle continues to move toward the detected object and a first threshold is reached, light braking is applied. If the vehicle continues to move toward the detected object and a second threshold is reached, heavier braking up to full braking is applied to prevent the vehicle from colliding with the object.

18 Claims, 5 Drawing Sheets

(56) References Cited

U.S. PATENT DOCUMENTS 9,221,436 B2 * 12/2015 Shimizu .................. B60T 7/22

FOREIGN PATENT DOCUMENTS

| EP | 1932735 | 6/2008 |
| EP | 1992538 | 11/2008 |
| WO | 03006291 | 1/2003 |
| WO | 2008065396 | 6/2008 |
| WO | 2013121961 | 8/2013 |

* cited by examiner

AUTOMATIC REAR BRAKING

FIELD

Embodiments of the present invention relate to a brake control system for a vehicle, specifically for controlling vehicle braking in response to objects detected to the rear of the vehicle.

BACKGROUND

In today's market, automobiles have begun to make use of radar and ultrasonic sensing technologies to improve driver comfort and safety. Systems that automatically apply the brakes when driving in reverse have recently entered the market. These systems use radar or ultrasonic sensors to detect objects behind the vehicle, and apply the brakes to warn the driver or to reduce speed before a crash.

SUMMARY

In one embodiment, the invention provides a method for controlling a vehicle brake system while the vehicle is in reverse. The method includes prefilling the brake system upon detecting an object in the vehicle's path. If the vehicle continues to move toward the detected object and a first threshold is reached, light braking is applied. If the vehicle continues to move toward the detected object and a second threshold is reached, heavier braking up to full braking is applied to prevent the vehicle from colliding with the object. This invention allows for safe braking at higher speeds than existing systems, and by using sensors that are commonly installed in vehicles for parking assistance and blind spot detection.

In another embodiment, the invention provides a brake control system for a vehicle. The system includes a dynamic state sensor for the vehicle, an object detection sensor, and a controller. The object detection sensor can include, for example, a radar sensor and/or an ultrasonic sensor. The dynamic state sensors can include a vehicle speed sensor and/or a steering sensor. The controller determines a path of the vehicle based on signals received from the dynamic state sensor. The controller is also configured to detect an object based on the vehicle's determined path (e.g., such as can be determined by the steering sensor signal, among other signals). Further, the controller detects objects based on input from the object detection sensor. When the controller detects an object in the vehicle's path (i.e., the vehicle's rear path), the controller prefills the brake system. If the vehicle continues to approach the detected object and the vehicle's dynamic state reaches a first threshold, the controller applies a first braking amount. If the vehicle approaches the object and the vehicle's dynamic state reaches a second threshold, the controller applies a second braking amount.

Other aspects of the invention will become apparent by consideration of the detailed description and accompanying drawings.

DETAILED DESCRIPTION

Figure 1:
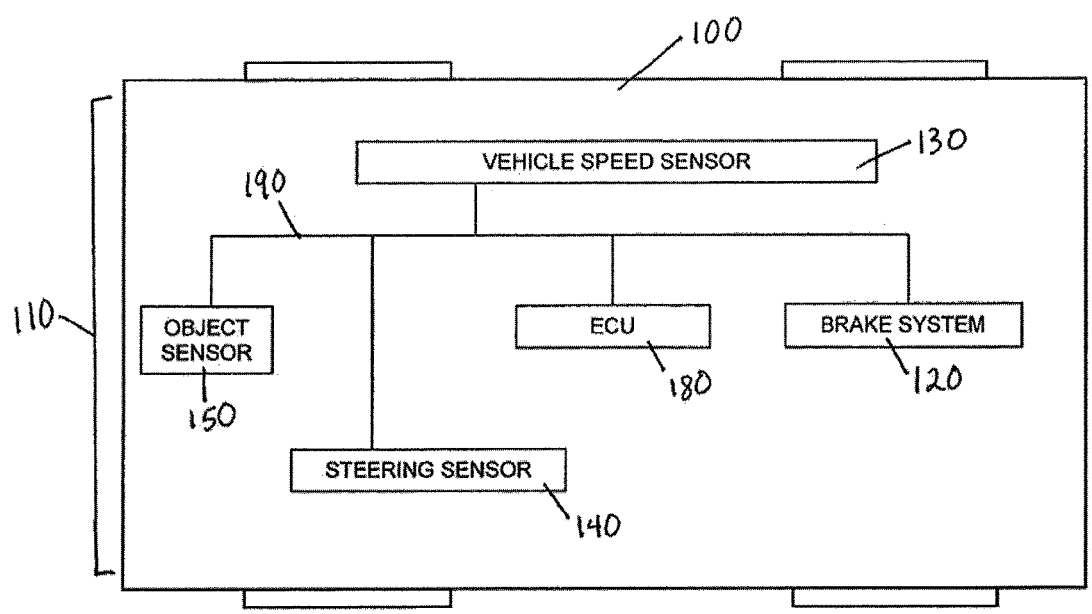
FIG. 1 schematically illustrates a vehicle control system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

The invention applies a staged braking response upon detecting a stationary object in the rearward path of a vehicle. In particular, when the vehicle is driving in reverse and detects a stationary object, the vehicle brake system is prefilled to prepare for braking. If the vehicle continues to approach the detected object and certain relative speed and distance thresholds are met, light braking is applied to warn the driver that an object has been detected in the vehicle path. If it is determined that the vehicle is still approaching the object, heavier braking is applied (up to full braking) to reduce the vehicle speed and/or stop the vehicle to avoid collision with the object.

FIG. 1 illustrates a control system 110 for a vehicle. The control system 110 includes an electronic control unit 180, a brake system 120, a vehicle speed sensor 130, a steering sensor 140, and an object sensor 150. The brake system 120 may include known components or systems for adjusting the braking of the vehicle 100, such as a brake controller module or pressurized brakes. The vehicle speed sensor 130 that detects the speed or velocity of the vehicle 100, and the steering sensor 140 detects changes in steering direction of the vehicle 100. The object detection sensor 150 that detects objects in the vicinity of the vehicle 100. The object detection sensor 150 may include any suitable object detecting sensors, such as a radar sensor, an ultrasonic sensor, or a video sensor. The object detection sensor 150 may be used alone or in combination with other sensors. The controller 180 (or electronic control unit, "ECU") communicates electronically with sensors 130, 140, and 150 over a communication bus 190. The controller 180 also communicates with the brake system 120 via the bus 190. It should be noted that bus 190 can encompasses both wired and wireless forms of connection or data communication, and that one or more sensors can communicate with the controller 180 via a direct connection.

Figure 2:
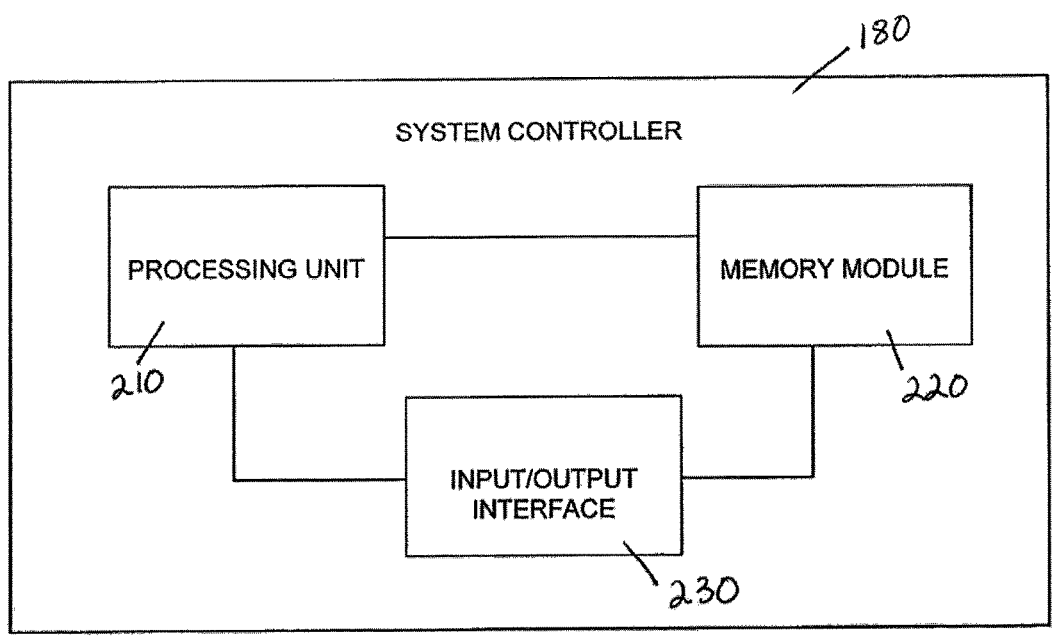
FIG. 2 schematically illustrates a controller included in the system of FIG. 1.

The controller 180 may be a microprocessor-based controller such as a computer. FIG. 2 illustrates the controller 180. The controller 180 includes a processing unit 210 (e.g., a microprocessor, an application specific integrated circuit ("ASIC"), etc.), one or more memory modules 220, and an input/output interface 230. The memory modules 220 include non-transitory computer-readable media, such as random-access memory ("RAM") and/or read-only memory ("ROM"). The processing unit 210 can retrieve instructions from the memory modules 220 and execute the instructions to perform particular functionality. The processing unit 210 can also retrieve and store data to the memory modules as part of executing the instructions.

In addition, the processing unit 210 can obtain data from devices and systems external to the controller 180 through the input/output interface 230. For example, as noted above, the controller 180 communicates with the sensors 130, 140, and 150. The controller 180 also provides output to the brake system 120. Therefore, the input/output interface 230 connects the controller 180 to the sensors 130, 140, and 150, as well as to the brake system 120, over the communication bus 190, as described above with regard to FIG. 1.

It should also be understood that the controller 180 can include additional components other than those described herein. Furthermore, in some embodiments, the functionality of the controller 180 can be distributed among multiple systems or devices. Also, in some embodiments, the functionality of the controller 180 can be combined with other systems or devices. For example, in some embodiments, the controller 180 may also perform in part the functionality of the brake system 120.

Figure 3A:
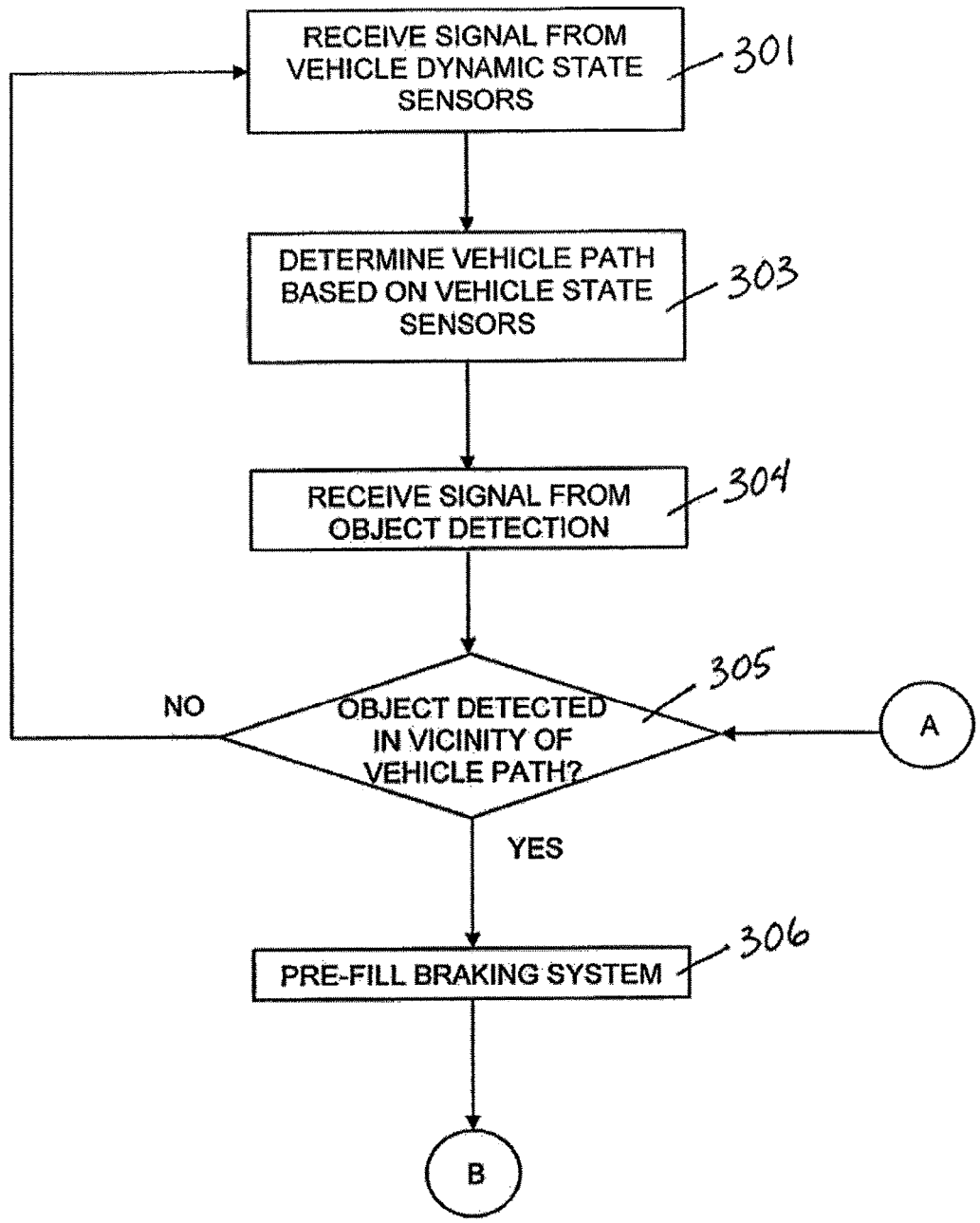
FIG. 3A is a flowchart illustrating control logic of the system of FIG. 1.

Controller 180 contains logic that is executed by the processing unit 210. This logic, among other functions, controls vehicle braking based on detected stationary objects to the rear of the vehicle. FIG. 3A shows an embodiment of the logic employed by the system 110 while the vehicle 100 is driving in reverse. At block 301 in FIG. 3A, the controller 180 receives the vehicle's 100 dynamic state (driving parameters) from the vehicle speed sensor 130, the steering sensor 140, and the object detection sensor 150; herein referred to collectively as "dynamic state sensors." The sensed dynamic state may include a speed of the vehicle 100 driving in reverse from the speed sensor 130, a change in steering direction from the steering sensor 140, and one or more detected object indications from the object detection sensor 150. At block 303, the controller 180 uses the vehicle dynamic state information, particularly the sensed steering direction, to predict the vehicle's path, such as can be done for other driver-assistance functions such as parking assistance. The vehicle dynamic state received by the controller 180 may be stored in the memory module 220 to be accessed by the processor 210. The vehicle dynamic state is continuously updated in the memory module 220 by the vehicle dynamic state sensors.

At block 304, the controller 180 receives a signal from the object detection sensor 150 indicating whether an object has been detected. At block 305, the controller 180 determines where the object is relative to the vehicle's 100 predicted path. If the controller 180 determines that the object is not within or near the vehicle's 100 predicted path, the process returns to block 301 and does not apply automatic braking. However, if the controller 180 determines that the object is in or near the vehicle's predicted path, an automatic braking procedure is implemented. At block 306, the brake system 120 is signaled by the controller 180 to prefill the brakes as the vehicle 100 approaches the detected object. Prefilling the brakes prepares the vehicle 100 for braking before the driver operates the brake pedal.

Figure 3B:
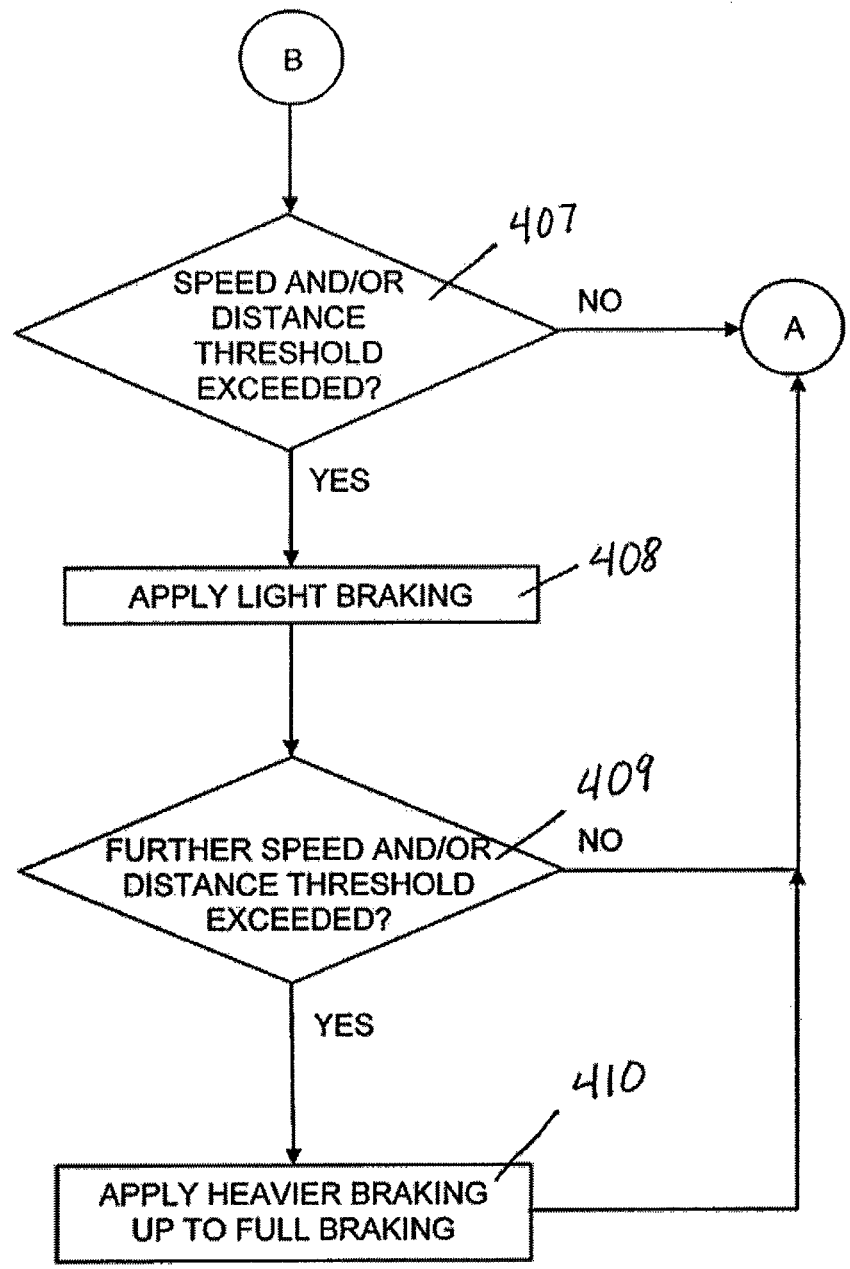
FIG. 3B is a flowchart illustrating a continuation of the control logic of FIG. 3A.

After prefilling the brakes at block 306, the process proceeds to block 407 (shown in FIG. 3B). At block 407, the controller 180 determines, based on current data from the vehicle dynamic state sensors and the object detection sensor 150, whether braking should occur because the vehicle 100 has reached predetermined speed or distance thresholds with respect to the detected object. For example, if the vehicle 100 is approaching the detected object and is less than a certain distance from the detected object, the process proceeds to block 408 where the brake system 120 is signaled to apply light braking (e.g., 0.1-0.35 g) to warn the driver of the object. Similarly, if the vehicle 100 is sensed to be approaching the object at a certain speed relative to the object (such that the vehicle is likely to strike the object), light braking is applied as a warning to the driver. The distance and speed thresholds can be dependent on each other. That is, the distance threshold can be larger at higher speeds and lower at slower speeds. If it is determined at block 407 that the vehicle has not reached the predetermined speed and/or distance thresholds, the process returns to block 305 to continue checking whether braking should be applied.

After applying light braking (block 408), the controller 180 determines (block 409) whether the vehicle 100 is continuing to approach the detected object (despite light braking) and has reached a second set of speed and/or distance thresholds with respect to the object. For example, if the vehicle 100 has achieved a second threshold distance (between the object and the vehicle 100) that is shorter than the distance that triggered light braking (i.e., the first threshold distance), the brake system 120 is signaled to apply heavier braking (block 410) to reduce the speed of the vehicle further and prevent a collision with the detected object. Also, the controller 180 can determine, based on the detected speed of the vehicle 100, that a collision with the detected object is imminent at the present speed. In some embodiments, when an object is detected within the vehicle's 100 path and speed and/or distance thresholds are reached, increasingly heavier braking can be applied, up to full braking, such that the vehicle 100 is stopped before a collision occurs, even if the driver fails to intervene.

Figure 4:
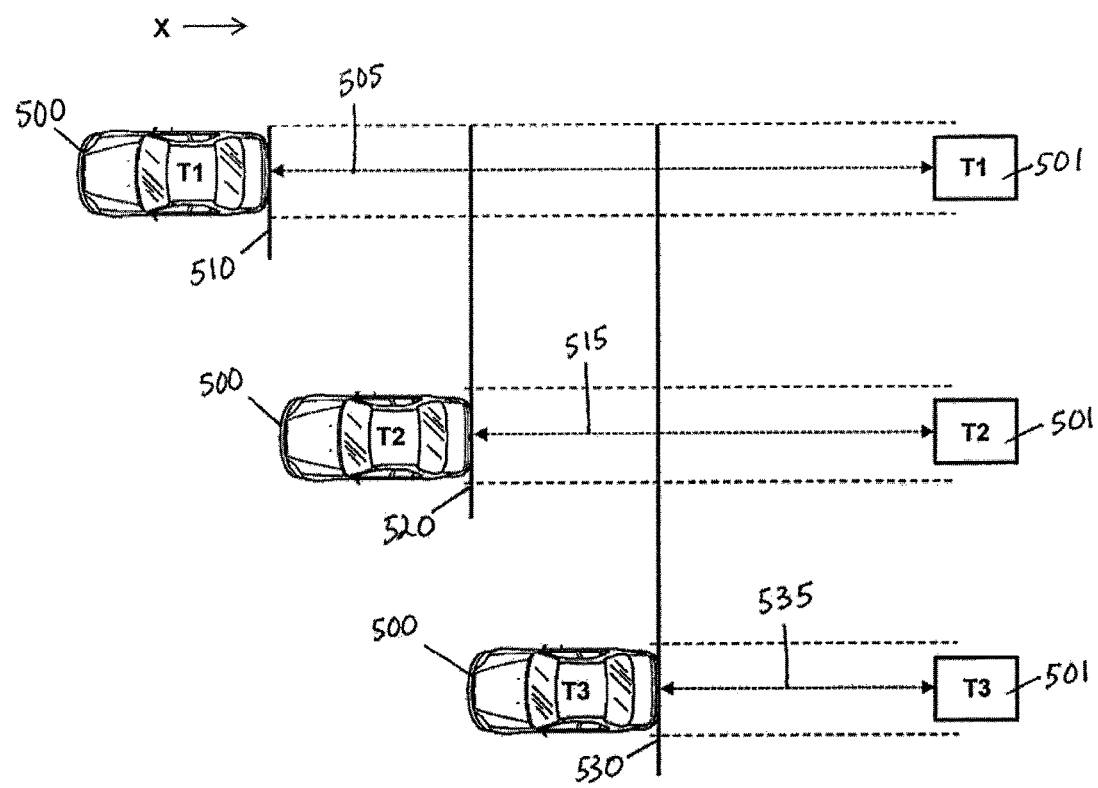
FIG. 4 diagrammatically illustrates a vehicle having the system of FIG. 1 in an exemplary scenario.

FIG. 4 illustrates a vehicle 500 including the system 110. The vehicle 500 is shown driving in reverse (direction "X") toward an object 501 at different time points (T1, T2, and T3). In this exemplary scenario, the vehicle 500 uses two radar sensors mounted in the rear corners of the vehicle, and four ultrasonic sensors mounted along the rear bumper, as object detection sensors. The radar sensors can be used, for example, to detect objects within a first range of distances away from the vehicle (such as within 10 meters of the vehicle), and the ultrasonic sensors can detect objects within a second, shorter range of distances away from the vehicle (such as within 2.5 meters of the vehicle). As the vehicle 500 drives in reverse, the controller 180 continuously executes the logic of FIGS. 3 and 4. However, the logic of FIGS. 3 and 4 are not limited strictly to the exemplary scenarios discussed herein with regard to FIG. 4. The logic presented in FIG. 3A can be widely implemented in a plurality of other hardware or software based devices, and therefore in a plurality of different scenarios, as well.

At time T1, the vehicle 500 is a first distance 505 away from the object 501. The controller 180 executes the control logic of blocks 301-304, receiving data from the vehicle dynamic state sensors and the object detection sensors 150. Since the first distance 505 is within range of the vehicle's 500 radar sensors, the controller 180 determines that the object 501 is within the path of the vehicle 500, and that the vehicle 500 is approaching the object 501 (block 305). The controller 180, based on this determination, signals the brake system 120 to prefill the brakes of the vehicle 500 at event point 510 (block 306). At time T2, the vehicle 500 is a second distance 515 away from the object 501, and has reached a first threshold 520. The first threshold 520 can be a predetermined speed of the vehicle 100 with respect to the object 501, a predetermined distance of the vehicle 500 with respect to the object 501, or a combination. In the exemplary scenario of FIG. 4, however, the first threshold 520 is illustrated as a predetermined distance 515 between the vehicle 500 and the object 501. When the vehicle 500 reaches the first threshold 520, the brake system 120 applies light braking to warn the driver of the detected object 501.

At time T3, the vehicle 500 is continuing to approach the object 501 and reaches a second threshold 530. In the scenario of FIG. 4, the second threshold 530 is a predetermined distance 535 between the vehicle 500 and the object 501 that is within range of both the radar sensors and the ultrasonic sensors. In some embodiments, the second threshold 530 is the point at which both the ultrasonic sensors and the radar sensors detect the object 501. In some embodiments, as the vehicle 500 travels over the distance 535, the brake system 120 applies increasingly heavier braking (e.g., in increments commensurate with the decrease in distance between the vehicle 500 and the object 501) until full braking is reached a safe distance before collision with the object 501.

The amount of braking applied by the system 110 (for both light braking and heavier braking) can be determined based on which sensors have detected the object 501. For example, as previously mentioned for the scenario of FIG. 4, heavier braking can be applied when both the radar sensors and the ultrasonic sensors detect the object 501 (implying that certain predetermined distances have been reached). However, the amount of braking applied by the system 110 can also be determined based on the speed and path of the vehicle and object with respect to one another. Therefore, the amount of braking applied can vary with the speed of the vehicle with respect to the detected object. For example, for the vehicle 500 in FIG. 4, the second threshold 530 can be at distance 535 for a first speed, and at distance 515 for a second speed that is faster than the first speed. As such, the thresholds described herein are not merely limited to distances. Further, the invention can be implemented in cases where the object is mobile as well as stationary.

Also, as previously mentioned, data received from different sensor types, such as from the radar and ultrasonic sensors, can be fused to handle special cases. For example, if an object at vehicle start is close enough to the rear of the vehicle as to be detected by the ultrasonic sensors, the system 110 can apply braking based on distance data from the ultrasonic sensors only (i.e., can apply heavier braking automatically, without applying light braking to warn the driver, first). Further, location information from multiple sensors can be used to more accurately define the position of objects, resulting in fewer false brake activations.

Thus, embodiments of the invention relate to systems and methods for controlling braking of a vehicle. Particularly, embodiments of the invention relate to methods for controlling vehicle braking while the vehicle is driving in reverse and approaching a detected object. Embodiments of the invention are not limited to the exemplary scenarios described herein, and are therefore applicable to a plurality of different scenarios and arrangements of hardware or software-based devices. It should also be noted that the thresholds, values, and parameters described are all subject to tuning. Furthermore, different uses for the invention described herein may be applicable. This method may also be applied to any vehicle, regardless of whether they are moving, driving in the same direction, or oncoming. This method may also be used in systems that include video sensors so as to improve detection, classification, and tracking of objects (such as bicycles, pedestrians, and children).

Various features of the invention are set forth in the following claims.

What is claimed is:

1. A control system for a vehicle, the system comprising:
   a dynamic state sensor;
   an object detection sensor; and,
   a controller configured to:
      determine a path of the vehicle based on a signal from the dynamic state sensor;
      detect an object based on the vehicle's path and a signal from the object detection sensor; and,
      control a braking system of the vehicle based on the determined path and the detected object, wherein, the controller is configured to control the braking system by prefilling the brake system when the object is detected regardless of a value of the signal from the dynamic state sensor and prior to analyzing any speed data, applying a first braking amount when a value of the signal from the dynamic state sensor reaches a first threshold, and applying a second braking amount when a value of the signal from the dynamic state sensor reaches a second threshold.

2. The system of claim 1, wherein the controller determines the vehicle's path to the rear of the vehicle.

3. The system of claim 1, wherein the dynamic state sensor consists of at least one from the group of a steering angle sensor and a vehicle speed sensor.

4. The system of claim 1, wherein the object detection sensor consists of at least one from the group of a radar sensor and an ultrasonic sensor.

5. The system of claim 4, wherein the controller applies the first braking amount based on a signal from a radar sensor, and applies the second braking amount based on a signal from an ultrasonic sensor.

6. The system of claim 4, wherein the radar sensor detects objects within 10 meters of the vehicle, and the ultrasonic sensor detects objects within 2.5 meters of the vehicle.

7. The system of claim 1, wherein the first threshold is a first predefined distance between the vehicle and the detected object, and the second threshold is a second predefined distance between the vehicle and the detected object that is less than the first predefined distance.

8. The system of claim 7, wherein the first and second predefined distances are determined based on the signal from the vehicle speed sensor.

9. The system of claim 1, wherein the first and second braking amounts are determined based on at least one from a group consisting of a signal from the vehicle speed sensor and a signal from the object detection sensor.

10. A method for controlling a vehicle, comprising:
   receiving a signal from a dynamic state sensor;
   receiving a signal from an object detection sensor;
   determining a path of the vehicle based on the signal from the dynamic state sensor;
   detecting an object in the vehicle's path and, controlling a braking system of the vehicle based on the determined path and the detected object;

wherein controlling a braking system of a vehicle includes, prefilling the brake system when the object is detected regardless of a value of the signal from the dynamic state sensor and prior to analyzing any speed data, applying a first braking amount when a value of the signal from the dynamic state sensor reaches a first threshold, and applying a second braking amount when a value of the signal from the dynamic state sensor-reaches a second threshold.

11. The method of claim 10, wherein determining a path of the vehicle includes determining a path to the rear of the vehicle.

12. The method of claim 10, wherein receiving the signal from the vehicle state sensor includes receiving a signal from at least one from a group consisting of a steering angle sensor and a vehicle speed sensor.

13. The method of claim 12, wherein applying the first and second braking amounts include:
applying the first braking amount based on a signal from a radar sensor; and,
applying the second braking amount based on a signal from an ultrasonic sensor.

14. The method of claim 12, wherein receiving the signal from the radar sensor includes receiving a signal for objects detected within 10 meters of the vehicle, and receiving the signal from the ultrasonic sensor includes receiving a signal for objects detected within 2.5 meters of the vehicle.

15. The method of claim 10, wherein receiving the signal from the object detection sensor includes receiving a signal from at least one from a group consisting of a radar sensor and an ultrasonic sensor.

16. The method of claim 10, wherein applying the first and second braking amounts includes:
applying the first braking amount when the vehicle reaches a first predefined distance between the vehicle and the detected object; and
applying the second braking amount when the vehicle reaches a second predefined distance between the vehicle and the detected object, the second predefined distance being less than the first predefined distance.

17. The method of claim 16, wherein applying the first and second braking amounts further includes determining the first and second predefined distances based on the signal from the vehicle speed sensor.

18. The method of claim 10, wherein determining the first and second braking amounts include determining the amounts based on at least one from a group consisting of a signal from the vehicle speed sensor and a signal from the object detection sensor.

* * * * *